(12) United States Patent
Wu

(10) Patent No.: US 10,203,510 B2
(45) Date of Patent: Feb. 12, 2019

(54) FRESNEL LIQUID CRYSTAL LENS PANEL, MANUFACTURING METHOD THEREOF AND 3D DISPLAY

(71) Applicant: BOE Technology Group Co., Ltd., Beijing (CN)

(72) Inventor: Kun Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 509 days.

(21) Appl. No.: 14/771,232

(22) PCT Filed: Aug. 29, 2014

(86) PCT No.: PCT/CN2014/085506
§ 371 (c)(1),
(2) Date: Aug. 28, 2015

(87) PCT Pub. No.: WO2015/192476
PCT Pub. Date: Dec. 23, 2015

(65) Prior Publication Data
US 2016/0363781 A1 Dec. 15, 2016

(30) Foreign Application Priority Data
Jun. 20, 2014 (CN) .......................... 2014 1 0279835

(51) Int. Cl.
G02F 1/13 (2006.01)
G02F 1/1339 (2006.01)
(Continued)

(52) U.S. Cl.
CPC ........... *G02B 27/2242* (2013.01); *G02B 3/14* (2013.01); *G02B 27/2214* (2013.01);
(Continued)

(58) Field of Classification Search
CPC ......... G02F 1/1323; G02F 2001/13396; G02B 27/22; G02B 21/22; G02B 27/02; G02B 27/2278
(Continued)

(56) References Cited

U.S. PATENT DOCUMENTS 8,279,362 B2 10/2012 Yun et al.
2008/0106806 A1 5/2008 Hendriks et al.
(Continued)

FOREIGN PATENT DOCUMENTS

CN 101073022 A 11/2007
CN 101950085 A 1/2011
(Continued)

OTHER PUBLICATIONS

First Office Action, including Search Report, for Chinese Patent Application No. 201410279835.5, dated May 5, 2016, 10 pages.
(Continued)

*Primary Examiner* — Wen-Ying P Chen
(74) *Attorney, Agent, or Firm* — Westman, Champlin & Koehler, P.A.

(57) ABSTRACT

There is disclosed a Fresnel liquid crystal lens panel for a naked eye three-dimensional display, a manufacturing method thereof, and a 3D display using the same. The Fresnel liquid crystal lens panel comprises: a Fresnel liquid crystal lens panel for a naked eye three-dimensional display, comprising: a first substrate comprising a first transparent substrate and a first electrode; a second substrate comprising a second transparent substrate and a plurality of second electrodes; a liquid crystal layer divided into a plurality of lens regions to form a Fresnel liquid crystal lens; and a plurality of insulating barrier blocks being located at an inner side of the second substrate and arranged between two adjacent side lobes of the Fresnel liquid crystal lens. Since (Continued)

the adjacent side lobes are partitioned by means of the insulating barrier block at the boundary therebetween, the crosstalk within the lens region is reduced.

18 Claims, 6 Drawing Sheets

(51) Int. Cl.
| | | |
|---|---|---|
| *G02F 1/1335* | (2006.01) | |
| *G02B 27/22* | (2018.01) | |
| *G02F 1/29* | (2006.01) | |
| *G02F 1/1333* | (2006.01) | |
| *G02B 3/14* | (2006.01) | |
| *G02B 3/08* | (2006.01) | |

(52) U.S. Cl.
CPC .... *G02F 1/13394* (2013.01); *G02F 1/133377* (2013.01); *G02F 1/29* (2013.01); *G02B 3/08* (2013.01); *G02F 1/1323* (2013.01); *G02F 1/1326* (2013.01); *G02F 1/1339* (2013.01); *G02F 1/133526* (2013.01); *G02F 2001/13396* (2013.01); *G02F 2001/13398* (2013.01); *G02F 2001/294* (2013.01)

(58) Field of Classification Search
USPC .......................................................... 349/157
See application file for complete search history.

(56) References Cited

U.S. PATENT DOCUMENTS

| | | | | |
|---|---|---|---|---|
| 2010/0141880 | A1* | 6/2010 | Koito | ................. G02F 1/13394 349/123 |
| 2012/0300042 | A1 | 11/2012 | Yun et al. | |
| 2013/0063691 | A1* | 3/2013 | Takama | .............. G02F 1/13394 349/143 |

FOREIGN PATENT DOCUMENTS

| | | |
|---|---|---|
| CN | 102109729 A | 6/2011 |
| CN | 102256100 A | 11/2011 |
| CN | 102967969 A | 3/2013 |
| CN | 103293772 A | 9/2013 |
| CN | 103760712 A | 4/2014 |
| EP | 2 682 810 A1 | 1/2014 |
| JP | 2011048235 A | 3/2011 |

OTHER PUBLICATIONS

International Search Report and Written Opinion for PCT Application No. PCT/CN2014/085506, dated Mar. 24, 2015, 11 pages.
English translation of Box No. V of the Written Opinion of the International Searching Authority for PCT Application No. PCT/CN2014/085506, 3 pages.

* cited by examiner

FRESNEL LIQUID CRYSTAL LENS PANEL, MANUFACTURING METHOD THEREOF AND 3D DISPLAY

CROSS-REFERENCE TO RELATED APPLICATION

This application is a Section 371 National Stage Application of International Application No. PCT/CN2014/085506, filed 29 Aug. 2014, which claims the benefit of Chinese Patent Application No. 201410279835.5 filed on Jun. 20, 2014 in the State Intellectual Property Office of China, the disclosure of which is incorporated in entirety herein by reference.

BACKGROUND OF THE INVENTION

Field of the Invention

The present disclosure relates to a technical field of liquid crystal display, in particular, relates to a Fresnel liquid crystal lens panel for a naked eye three-dimensional (3D) display, a manufacturing method thereof, and a 3D display including the same.

Description of the Related Art

Human vision is stereoscopic, that is, images of the world captured by two eyes are slightly different. Brain combines these two images (so-called stereo-matching) to give depth of field. Principle of 3D stereoscopic display is that: individual images (usually, planar images) corresponding to what is captured when viewing scene of the real world are reproduced to each eye, then brain recombines two individual images (i.e., stereo-matching), to give depth of field of the images (i.e., three-dimensional effect). Among technologies for achieving three-dimensional display, the naked eye three-dimensional display has been widely accepted in the three-dimensional display field due to an advantage that it is unnecessary for viewers to use glasses.

Currently, to achieve the naked eye three-dimensional display, the main way is to provide a grating in front of a display panel, to divide pixel units of the display panel into odd columns of pixels and even columns of pixels in a horizontal direction, so as to provide a viewer's left and right eyes with two different images, respectively, thereby depth of field is formed by means of parallax effect between left eye and right eye images of the viewer, and thus produce a three-dimensional display effect. Existing gratings include monochrome parallax barrier gratings, columnar physical lenses and the like. However, since spacing of general grating cannot be adjusted, the viewer has to be limited within a specific viewing distance to view, flexibility and viewing distance are limited, which limits the application of grating stereoscopic display technology in life. To this end, in the industry, a liquid crystal barrier grating and a liquid crystal lens, in which grating pitch may be adjusted by adjusting voltage, have been developed.

FIG. 1 is a horizontal cross-sectional view showing schematically a naked eye three-dimensional display liquid crystal panel using a liquid crystal lens in prior art. Please refer to FIG. 1, in viewer's view direction, the naked eye three-dimensional display liquid crystal panel includes from bottom to top: a 2D display panel 100 and a 3D lens panel arranged above the 2D display panel 100.

The 2D display panel 100 includes: a third glass substrate 110, a fourth glass substrate 120 and a liquid crystal layer 130 filled therebetween. An upper polarizer 111 is provided above the third glass substrate 110.

The 3D lens panel includes: an upper transparent substrate 200, a lower transparent substrate 300 and liquid crystal materials 400 filled therebetween. The lower transparent substrate 300 is fixed to the upper polarizer 111 provided above the 2D display panel 100 by a adhesive layer 112, a first planar electrode 210 is provided on the inner side of the upper transparent substrate 200, and second elongated electrodes 310 are provided on the inner side of the lower transparent substrate 300. Wherein, when a driving voltage is applied between the first electrode 210 and the second electrodes 310, liquid crystal molecules deflect. By applying different driving voltages at different locations within a predetermined region, different deflection directions of liquid crystal molecules are provided, thereby forming a liquid crystal lens whose refractive index is gradient-distributed, namely a GRIN liquid crystal lens (GRIN lens). With the aid of the GRIN lens, parts of an image provided by the 2D display panel are projected into the left eye, while other parts of the image are projected into the right eye, and as a result, the viewer may see a 3D image by means of separating the left eye visual image and right eye visual image.

However, with regard to the naked eye three-dimensional display liquid crystal panel, as shown in FIG. 1, since refractive index of the liquid crystal material is only approximately 0.1, the thickness of the liquid crystal cell is too large. A liquid crystal panel having a large cell thickness not only increases manufacturing process difficulty and cost, but also affects market promotion.

In place of GRIN lens, Fresnel lens technology has been developed to reduce the thickness of the naked eye 3D display liquid crystal panel. FIG. 2A is a schematic view showing structural relationship between a Fresnel lens and a traditional lens. Please refer to FIG. 2A, in the Fresnel lens, a lens having a gradient-distributed refractive index is cut into a plurality of circular lenses having the same center, and reference planes thereof are moved downwards to the same horizontal plane, and the surface curvatures thereof corresponds to the gradient-distributed refractive index, thus the thickness of the lens may be greatly reduced.

FIG. 2B is a cross-sectional view showing schematically a liquid crystal panel according to the Fresnel lens principle. Please refer to FIG. 2B, a liquid crystal material is filled between two substrates, and the liquid crystal material is divided into a plurality of lens regions. For each lens region, different driving voltages are applied to different second electrodes in the lens region, so that liquid crystal molecules in the lens region deflect at different angles, thus forming a Fresnel liquid crystal lens. Each portion of such Fresnel liquid crystal lens, whose refractive index is continuous, is referred as a side lobe 431, 432.

However, in prior art, there often exists overlapped or crossed areas between adjacent side lobes of the Fresnel liquid crystal lens, the boundary between the two adjacent side lobes is not clear enough, thereby resulting in an optical crosstalk within the lens region. For example, light which should have been refracted into the left eye is refracted into the right eye, and vice versa. Thus, 3D display effect is affected.

In addition, in the Fresnel liquid crystal lens panel in the prior art, spherical optical isolators or Photo Spacers (PS) are used to provide support between an upper and lower transparent substrates, since the position of a spherical optical isolator is not fixed and the spherical optical isolator often moves into the central region of the liquid crystal lens, which further increases the crosstalk of the stereoscopic display.

SUMMARY OF THE INVENTION

The embodiments of the present invention provide a Fresnel liquid crystal lens panel for a naked eye three-dimensional display, a manufacturing method thereof, and a 3D display using the same, so as to eliminate optical crosstalk existing in the Fresnel liquid crystal lens panel.

According to an aspect of the present disclosure, there is provided a Fresnel liquid crystal lens panel for a naked eye three-dimensional display, comprising: a first substrate comprising a first transparent substrate and a first electrode formed on an inner side of the first transparent substrate; a second substrate comprising a second transparent substrate arranged relative to the first transparent substrate and a plurality of spaced-apart, strip-shaped second electrodes formed on an inner side of the second transparent substrate; a liquid crystal layer filled in a space between the first and second substrates, and divided into a plurality of lens regions, liquid crystal molecules within each lens region being deflected at different angles to form a Fresnel liquid crystal lens when different driving voltages are applied to respective second electrodes within the lens region; and a plurality of insulating barrier blocks, each of the plurality of insulating barriers being located at an inner side of the second substrate and arranged between two adjacent side lobes of the Fresnel liquid crystal lens.

In the above described Fresnel liquid crystal lens panel, further comprising an optical isolator arranged at a boundary between two adjacent lens regions for blocking light in one of the two adjacent lens regions from being transmitted into the other one of the two adjacent lens regions.

In the above described Fresnel liquid crystal lens panel, the optical isolator and the insulating barrier blocks are made of a resin material.

In the above described Fresnel liquid crystal lens panel, transmittance of the resin material is greater than 90%, and viscosity of the resin material is greater than 10 mPa·s.

In the above described Fresnel liquid crystal lens panel, insulating barrier blocks are strip-shaped, and wherein a cross-section of each of the insulating barrier blocks is trapezoidal, rectangular or triangular.

In the above described Fresnel liquid crystal lens panel, the shape of the cross-section of each of the insulating barrier blocks is approximately an isosceles trapezoid satisfying:

$$H_2 < H, \text{ and}$$

$$L_{22} \leq L_{21} < L,$$

wherein H is cell thickness of the Fresnel liquid crystal lens panel, L is width of the second electrode, $H_2$, $L_{21}$, and $L_{22}$ are height, bottom side length and top side length of the isosceles trapezoid, respectively.

In the above described Fresnel liquid crystal lens panel, the insulating barrier blocks located at one side of a central line of the Fresnel liquid crystal lens are symmetrical to the insulating barrier blocks located at the other side of the central line.

In the above described Fresnel liquid crystal lens panel, each optical isolator has a frustoconical, cylindrical, prismatic or truncated pyramid shape.

In the above described Fresnel liquid crystal lens panel, the optical isolator has a frustoconical or truncated pyramid shape, and a cross-sectional shape of the optical isolator in a height direction is a trapezoid satisfying:

$$H \leq H_1 \leq 1.1H,$$

$$L_{11} \leq 5H$$

$$L_{12} \leq 3H, \text{ and}$$

$$L_{12} \leq L_{11},$$

wherein H is cell thickness of the Fresnel liquid crystal lens panel, $H_1$, $L_{11}$, and $L_{12}$ are height, bottom side length and top side length of the trapezoid, respectively.

In the above described Fresnel liquid crystal lens panel, the optical isolator comprises: a first portion fixed to the inner side of the second substrate, the height of the first portion being identical to that of the insulating barrier blocks; and a second portion fixed between the inner side of the first substrate and the first portion, and aligned with the first portion in a height direction.

In the above described Fresnel liquid crystal lens panel, the first portion of the optical isolator has a frustoconical shape, the cross-section of which in the height direction is a trapezoid, and the second portion of the optical isolator has a reverse frustoconical shape, the cross-section of which in the height direction is a reversed trapezoid.

In the above described Fresnel liquid crystal lens panel, wherein the first portion and the second portion of the optical isolator satisfy:

$$H \leq H_{11} + H_{12} \leq 1.1H$$

wherein, H is cell thickness of the Fresnel liquid crystal lens panel, $H_{11}$ and $H_{12}$ are heights of the first portion and the second portion of the optical isolator, respectively.

In the above described Fresnel liquid crystal lens panel, wherein, each lens region is provided with at least three second electrodes; both the first transparent substrate and the second transparent substrate are glass substrates, and both the first electrode and the second electrodes are made of indium tin oxide.

According to another aspect of embodiment of the present disclosure, there is provided a method for manufacturing Fresnel liquid crystal lens panel, comprising the steps of providing a plurality of spaced-apart strip-shaped second electrodes on a second transparent substrate to fonn a second substrate; performing a first coating of a resin material on the second substrate; etching the resin material coated by the first coating to form a plurality of spaced-apart first protrusions having a height $H_1$; performing a second coating of the resin material, and etching the resin material coated by the second coating again, and maintaining the height of the first protrusions located at an outer region of the second substrate unchanged, while reducing the heights of other first protrusions to a predetermined height $H_2$, thereby forming second protrusions; assembling the first substrate with the second substrate such that the first protrusions are used as optical isolators and the second protrusions are used as insulating barrier blocks; and filling liquid crystal material into a space between the first substrate and the second substrate.

In the above described method, the resin material coated by the first coating is etched by means of a first mask having through-holes corresponding to the shape of the insulating barrier blocks and the optical isolators, and the resin material coated by the second coating is etched by means of a second mask having through-holes corresponding to the shape of the optical isolators.

According to a further aspect of embodiment of the present disclosure, there is provided a method for manufacturing a Fresnel liquid crystal lens panel, comprising the steps of: providing a plurality of spaced-apart second electrodes on a second transparent substrate to form a second substrate; coating a resin material on the second substrate; etching the resin material coated to form a plurality of first protrusions having a height $H_2$; manufacturing a first electrode on a first transparent substrate to form a first substrate; coating a resin material on the first substrate; etching the resin material coated on the first substrate to form a plurality of second protrusions having a height $H_{12}$; assembling the first substrate with the second substrate such that parts of the first protrusions are aligned with the second protrusions to form optical isolators, and the other first protrusions are used as insulating barrier blocks; and filling liquid crystal material into a space between the first substrate and the second substrate.

In the above described method, the resin material coated on the second substrate is etched by means of a first mask having through-holes corresponding to the shape of the insulating barrier blocks and the optical isolators, and the resin material coated on the first substrate is etched by means of a second mask having through-holes corresponding to the shape of the optical isolators.

According to a still further aspect of embodiment of the present disclosure, there is provided a 3D display, comprising: a 2D display device; and a Fresnel liquid crystal lens panel according to any one of the above described embodiments disposed in front of the 2D display device in a direction toward a viewer.

In the above described 3D display, the 2D display device is a liquid crystal panel comprising a primary color pattern composed of a plurality of sub-pixel units and black matrixes located between adjacent sub-pixel units; and wherein the projection of an optical isolators of the Fresnel liquid crystal lens panel on the liquid crystal panel is located within the black matrixes.

According to a Fresnel liquid crystal lens panel for a naked eye three-dimensional display, a manufacturing method thereof, and a 3D display described in the above embodiments of the present invention, the adjacent side lobes of the Fresnel liquid crystal lens are partitioned by means of the insulating barrier block at the boundary therebetween, the crosstalk within the lens region is reduced.

DETAILED DESCRIPTION OF PREFERRED EMBODIMENTS OF THE INVENTION

Figure 1:
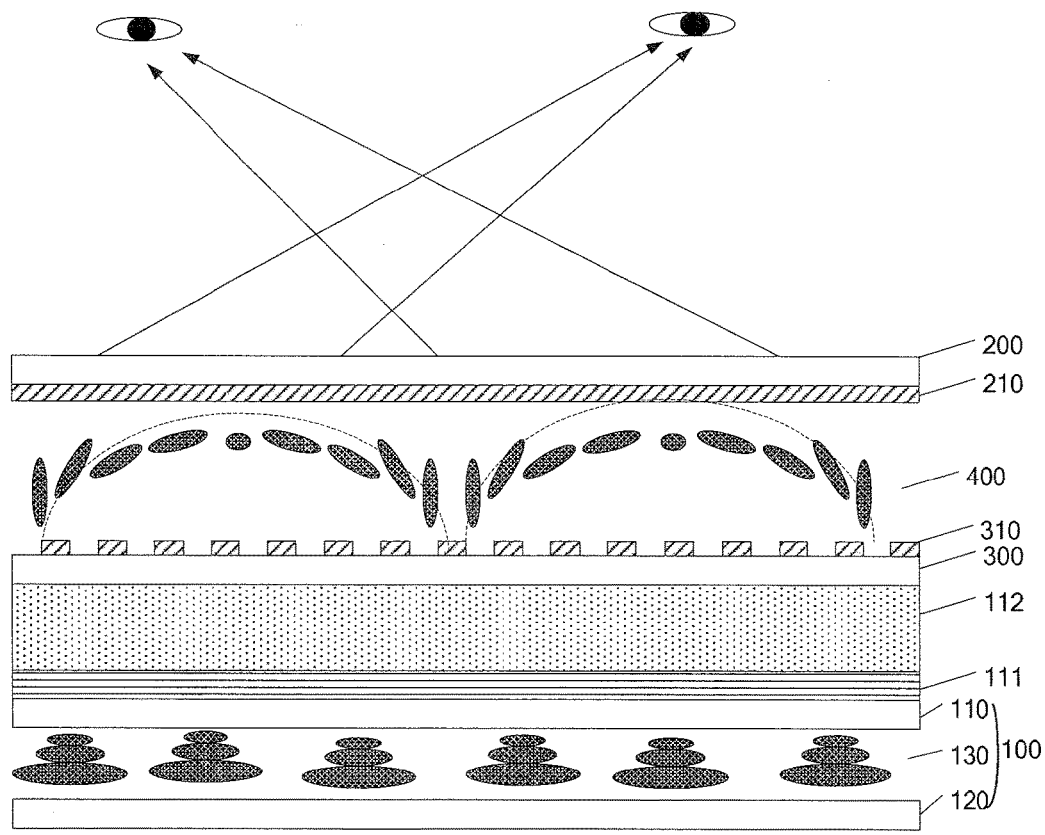
FIG. 1 is a partial cross-sectional view showing schematically a naked eye three-dimensional display liquid crystal panel including a liquid crystal lens in the prior art.
Figure 2A:
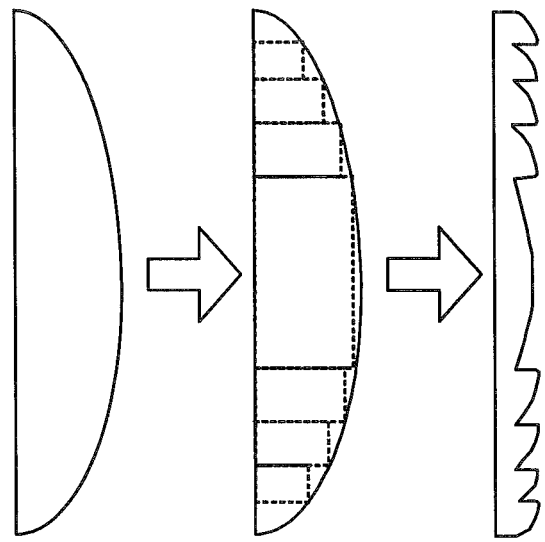
FIG. 2A is a schematic view showing structural relationship between a Fresnel lens and a traditional lens.
Figure 2B:
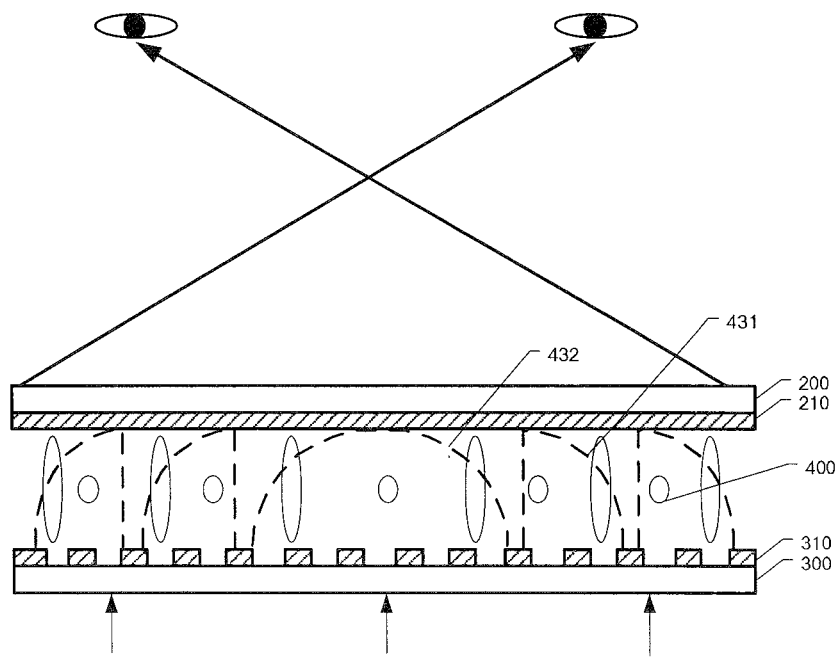
FIG. 2B is a partial cross-sectional view showing schematically a liquid crystal panel according to the Fresnel lens principle.

In order to present objective, technical solutions, and advantages of the present disclosure more apparently, the present disclosure will be further explained below in combination with the embodiments, and with reference to the figures. It should be noted that same numerals represent same or similar elements throughout description of the figures or the specification. Implementations not shown or illustrated in the drawings are known for those skilled in the art.

In addition, in the detailed description below, for explanation purpose, a lot of specific details are set forth to provide a complete understanding of the embodiments disclosed. However, it is apparent that one or more embodiments may be implemented without such specific details. In other cases, known structures and arrangements are schematically shown to simplify the figures.

According to a general concept of the present invention, there is provided a Fresnel liquid crystal lens panel, comprising: a first substrate comprising a first transparent substrate and a first electrode formed on an inner side of the first transparent substrate; a second substrate comprising a second transparent substrate arranged relative to the first transparent substrate and a plurality of spaced-apart, strip-shaped second electrodes formed on an inner side of the second transparent substrate; a liquid crystal layer filled in a space between the first and second substrates, and divided into a plurality of lens regions, liquid crystal molecules within each lens region being deflected at different angles to form a Fresnel liquid crystal lens when different driving voltages are applied to respective second electrodes within the lens region; and a plurality of insulating barrier blocks, each of the plurality of insulating barriers being located at an inner side of the second substrate and arranged between two adjacent side lobes of the Fresnel liquid crystal lens.

Figure 3:
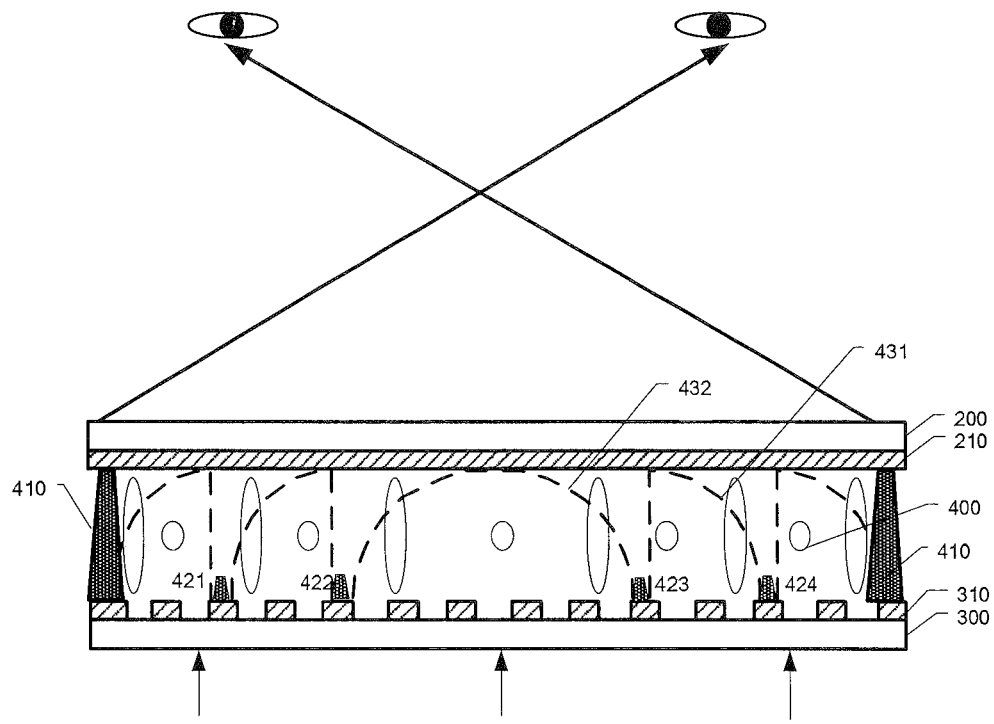
FIG. 3 is a partial cross-sectional view showing schematically a Fresnel liquid crystal lens panel for a naked eye three-dimensional display according to a first embodiment of the present invention.

FIG. 3 is a horizontal cross-sectional view showing schematically a Fresnel liquid crystal lens panel for a naked eye three-dimensional display according to an embodiment of the present invention, in which one lens region is shown.

Please refer to FIG. 3, the Fresnel liquid crystal lens panel for a naked eye three-dimensional display according to the present embodiment comprises from top to bottom: a first substrate comprising an upper transparent substrate 200 and a first electrode 210 formed on an inner side of the upper transparent substrate 200; a second substrate comprising a lower transparent substrate 300 arranged relative to the upper transparent substrate 200 and spaced-apart, strip-shaped second electrodes 310 formed on an inner side of the lower transparent substrate 300; a liquid crystal layer 400 filled in a space between the first and second substrates, and divided into a plurality of lens regions, liquid crystal molecules within each lens region being deflected at different angles to form a Fresnel liquid crystal lens when different driving voltages are applied to respective second electrodes within the lens region; and a plurality of insulating barrier blocks 421-424, each of the plurality of insulating barriers being located at an inner side of the second substrate and arranged between two adjacent side lobes of the Fresnel liquid crystal lens.

In the Fresnel liquid crystal lens panel according to an embodiment of the present invention, an optical isolator or photo spacer (PS) 410 is provided at a boundary between two adjacent lens regions for blocking light in one of the two adjacent lens regions from being transmitted into the other one of the two adjacent lens regions.

In the Fresnel liquid crystal lens according to the present embodiment, for each lens region, different driving voltages are applied to different second electrodes within the lens region, such that liquid crystal molecules within the lens region form a Fresnel liquid crystal lens. A plurality of insulating barrier blocks 421-424 fixed on the inner side of the second substrate are provided between side lobes of the Fresnel liquid crystal lens, so as to weaken the influence on the liquid crystal molecules in adjacent side lobes of the Fresnel liquid crystal lens by an electric field in one side lobe. In an exemplary embodiment, the optical isolator 410 and the insulating barrier blocks 421-424 are made of a resin material.

In the present embodiment, the upper transparent substrate and the lower transparent substrate both are made of glass, a person skilled in the art may adopt transparent substrates made of other materials if required, for example, transparent resin substrates, which is not limited in the present disclosure.

The first electrode 210 located on the inner side of the upper transparent substrate 200 form a planar distribution. The plurality of strip-shaped second electrodes 310 provided on the inner side of the lower transparent substrate 300 are distributed in parallel. The second electrodes may be arranged in a column direction, or in an inclined direction. For example, the second electrodes extend at an angle of 70 to 90 degrees relative to a side edge of an associated 2D display panel. Generally, the first electrode and the second electrodes are made of indium tin oxide (ITO).

In order to improve stereoscopic display effect, it can be understood by those skilled in the art that an upper alignment layer may be provided on the inner side of the first electrode 210, and a lower alignment layer may be provided on the inner side of the second electrode 310.

A liquid crystal layer 400 is filled in a space between the first and second substrates, and divided into a plurality of lens regions. Each lens region may include 2-9 sub-pixels. Each lens region occupies at least three second electrodes, when different driving voltages are applied to the different second electrodes, liquid crystal molecules within the lens region deflect at different angles to form a Fresnel liquid crystal lens.

Figure 4:
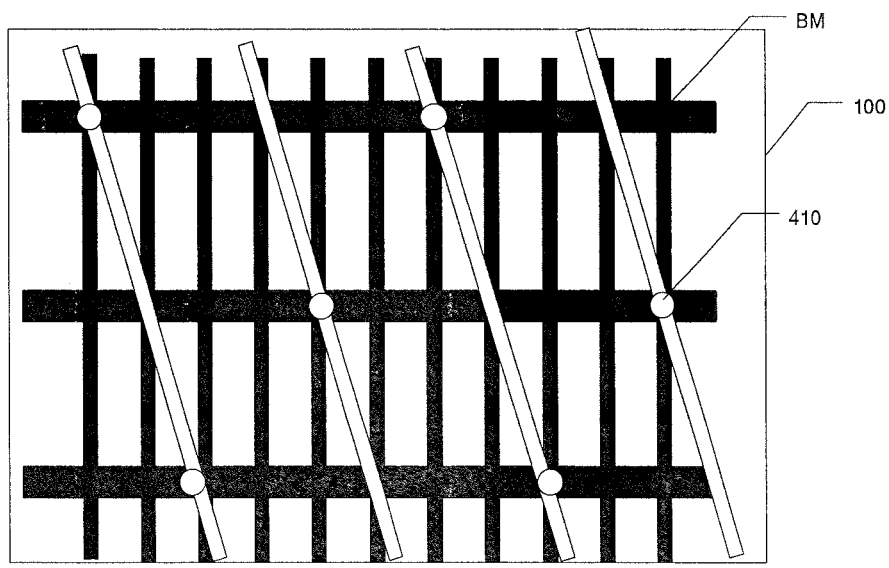
FIG. 4 is a schematic view showing the arrangement position of the optical isolators in the Fresnel liquid crystal lens panel shown in FIG. 3 and the corresponding relationship between the optical isolators and Black Matrixes (BM) in a 2D display panel.

In the present embodiment, by way of example, the lens regions arranged in an oblique direction is illustrated, as shown in FIG. 4. It should be noted that the lens regions may be arranged in a row or column direction, which is similar to the present embodiment, not described in detail herein.

The optical isolators 410 are provided at the boundary between adjacent lens regions to partition the first electrode from the second electrode. The optical isolators are fixed on inner side of the second electrodes, for example, the optical isolators are fixed on the lower transparent substrate 300, or the optical isolators are fixed on the second electrodes 310, or the optical isolators may be fixed on both the lower transparent substrate 300 and the second electrodes 310.

Figure 5:
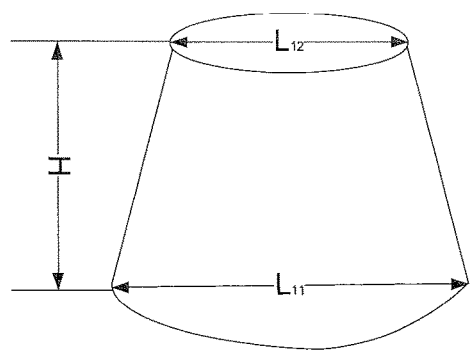
FIG. 5 is a schematic view showing the shape of the optical isolator in the Fresnel liquid crystal lens shown in FIG. 3.

As shown in FIG. 3, each optical isolator 410 has a frustoconical shape, and a cross-sectional shape of the optical isolator in height direction is an isosceles trapezoid. As shown in FIG. 5, the height $H_1$, the bottom side length $L_{11}$ and the top side length $L_{12}$ of the isosceles trapezoid are related with the cell thickness H of the Fresnel liquid crystal lens panel, for example, satisfying:

$$H \leq H_1 \leq 1.1H, L_{11} \leq 5H, L_{12} \leq 3H, L_{12} \leq L_{11} \quad (1)$$

It should be noted that the optical isolator may have a cylindrical, prismatic or truncated pyramid shape, etc., other than the frustoconical shape. In addition, the position and distribution density of the optical isolators are identical to that in the prior art, and will not described in detail herein.

In the present embodiment, the optical isolators 410 are fixed on the second electrodes. Since the positions of the optical isolators are fixed, the optical isolator cannot be moved to the positions of the liquid crystal sub-pixels, thereby a crosstalk can be avoided.

Liquid crystal materials in the lens region are formed to the Fresnel liquid crystal lens. The strip-shaped insulating barrier blocks are provided on the second electrodes between adjacent side lobes of the Fresnel liquid crystal lens, so as to weaken the influence from electric field generated in the lens region on the liquid crystal molecules on the left and right sides.

In the present embodiment, the insulating barrier blocks are fixed on the second electrodes, have a frustoconical shape, and cross-sectional shape thereof in a fixation direction is an isosceles trapezoid. The height $H_2$ of the trapezoid is smaller than the cell thickness H of the Fresnel liquid crystal lens panel, i.e., $H_2 \leq H$, the bottom edge length $L_{21}$ and the top edge length $L_{22}$ of the trapezoid are smaller than the width L of the stripped second electrodes, and $L_{22} \leq L_{21}$. In an exemplary embodiment, 3 μm$\leq H_2 \leq$5 μm, 2 μm$\leq L_{21} \leq$5 μm, 0 μm$\leq L_{22} \leq$4 μm.

Please refer to FIG. 3, in the Fresnel liquid crystal lens, the insulating barrier blocks located on one side of a central line are symmetrical to the insulating barrier blocks located on the other side of the central line. In this embodiment, the insulating barrier blocks 421 and 424 are symmetrical to each other, and the insulating barrier blocks 422 and 423 are symmetrical to each other, dimension and shape of the two corresponding insulating barrier blocks are approximately identical to each other, to make a substantially identical effect on the electrical field.

It should be noted that the insulating barrier blocks may have a cylindrical, conical, prismatic, truncated pyramid or pyramid shape, or other shapes, other than the frustoconical shape, which is not limited in the present disclosure.

In the present disclosure, the optical isolators and the insulating barrier blocks are made of a resin material. Wherein transmittance of the resin material for the optical isolators is greater than 90%, and viscosity of the resin material is greater than 10 mPa·s. Transmittance of the resin material for making the insulating barrier blocks is greater than 90%, and viscosity thereof is greater than 3 mPa·s.

In this embodiment, in order to simplify the manufacturing process, the resin material for manufacturing the optical isolators and the insulating barrier blocks are identical to each other. The resin material is composited of a solute material and a solvent material, the viscosity of the resin material may be adjusted by adjusting the solvent content.

In this embodiment, the solute material may be selected from one of the following: NN856 available from JSR company, KMH-T546 available from Osaka Organic Chemical Industry, and JSM-548-SS1 available from JSR company. The solvent material is selected from: EDM (Ethylene Glycol Dimethyl Ether) and PGMEA (Propylene Glycol Methyl Ether Acetate). In order to satisfy requirement for viscosity of the resin material, in the resin material for manufacturing the optical isolators and the insulating barrier blocks, the solvent contents both are less than or equal to 70%.

A manufacturing process of the Fresnel liquid crystal lens panel according to the present embodiment will be described below. The mask utilized during the manufacturing process includes a first mask having through-holes corresponding to the shape of the insulating barrier blocks and the optical isolators and a second mask having through-holes corresponding to the shape of the optical isolators.

Figure 6:
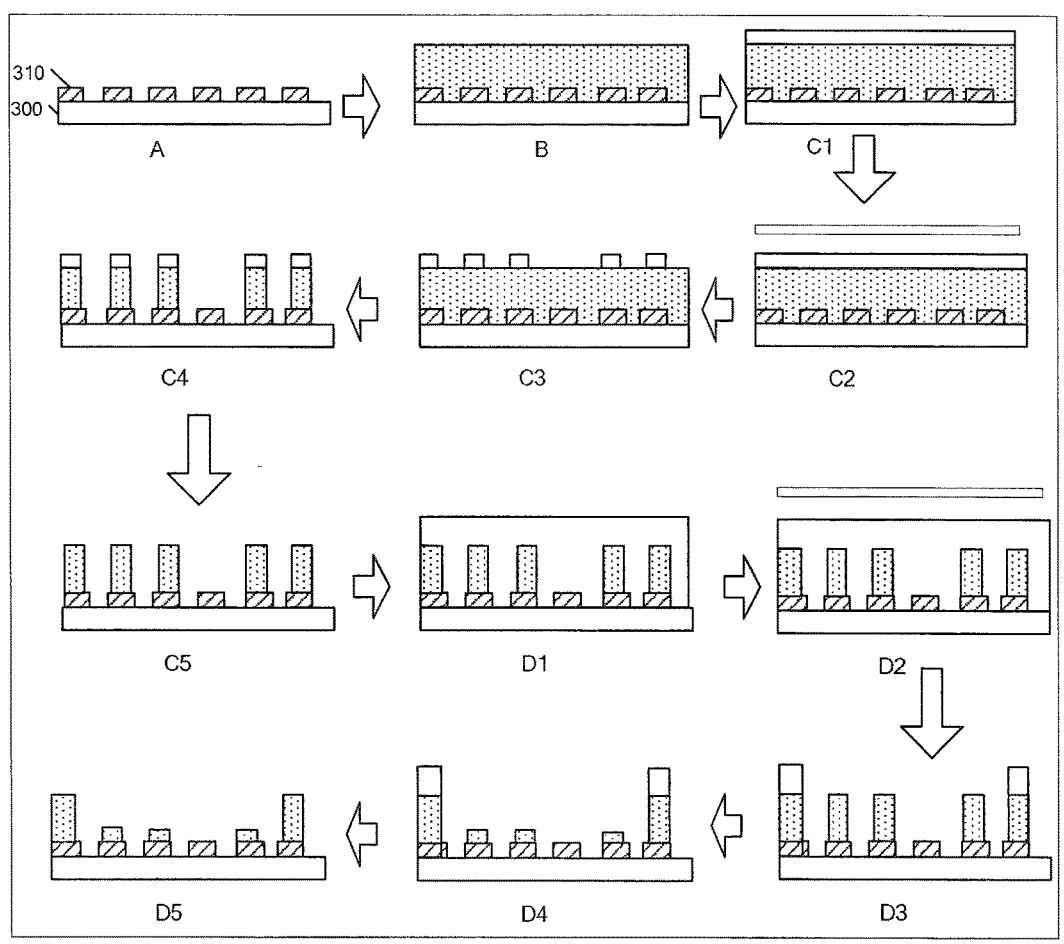
FIG. 6 is a partial cross-sectional view showing schematically the devices obtained after each step during the manufacture of the Fresnel liquid crystal lens panel shown in FIG. 3.

FIG. 6 is a partial cross-sectional view showing schematically the devices obtained after each step during the manufacture of the Fresnel liquid crystal lens panel shown in FIG. 3. In FIG. 6 and subsequent FIG. 8, for simplification purpose, the frustoconical optical isolators and insulating barrier blocks, which have actually a trapezoidal cross-section in height direction, are indicated by a cylindrical shape with a rectangular cross-section. Please refer to FIG. 6, the manufacturing process of the Fresnel liquid crystal lens panel shown in FIG. 3 comprises the following steps:

Step A: manufacturing strip-shaped second electrodes 310 on the lower transparent substrate 300 so as to form the second substrate, as shown in part A of FIG. 6.

Step B: coating a resin material on the second substrate, as shown in part B of FIG. 6. The composition and production process of such resin material have already been described previously, and will not be repeatedly herein. The coating thickness of the resin material is greater than or equal to the height of the optical isolators.

Step C: etching the resin material to form first protrusions having a height $H_1$ at locations where the optical isolators and the insulating barrier blocks are to be formed, wherein $H_1$ is a predetermined height of the optical isolators.

The step C includes specifically the following steps of:

Sub-step C1: coating a photoresist material on the resin material, as shown in part C1 of FIG. 6;

In an exemplary embodiment, the photoresist material is selected from a negative photoresist, for example, selected from the materials generally used in liquid crystal display (LCD) at present.

Sub-step C2: exposing the photoresist material using a first mask, as shown in part C2 of FIG. 6; through-holes corresponding to the shape of the optical isolators and insulating barrier blocks are provided in the mask;

Sub-step C3: removing the exposed photoresist to form a mask pattern, as shown in part C3 of FIG. 6;

Sub-step C4: etching the resin material by means of the mask pattern, as shown in part C4 of FIG. 6;

Sub-step C5: removing residual photoresist to obtain a plurality of first protrusions having the same height and spaced apart from each other, as shown in part C5 of FIG. 6.

It should be noted that, during etching the resin material, the first protrusions having a shape identical to the frustoconical shape of the optical isolators and the insulating barrier blocks to be formed may be formed by adjusting process conditions, the operation process is known to the person skilled in the art and will not be described in detail herein.

After implementing the step C5, the height of the plurality of first protrusions is identical to the predetermined height $H_1$ of the optical isolators to be formed, and in subsequent steps, the height needs to be reduced again for a part of the first protrusions.

Step D: etching the resin material again, and keeping the height of the first protrusions located at an outer region of the second substrate for forming the optical isolators unchanged, while reducing the height of other first protrusions used to form the insulating barrier blocks to a predetermined height $H_2$ of the insulating barrier blocks, thereby forming second protrusions.

The step D includes specifically the following steps of:

Sub-step D1: coating photoresist on the second substrate again, as shown in part D1 of FIG. 6;

Sub-step D2: exposing the photoresist using a second mask having through-holes corresponding to the shape of the optical isolators, as shown in part D2 of FIG. 6;

Sub-step D3: removing the exposed photoresist, uncovering the regions where the first protrusions for forming the insulating barrier blocks are located to form a photoresist mask pattern, as shown in part D3 of FIG. 6;

Sub-step D4: etching the resin material in the uncovered regions again until a part of the first protrusions is etched to the second protrusions having the predetermined height $H_2$, as shown in part D4 of FIG. 6;

Sub-step D5: removing residual photoresist to obtain the first protrusions used as the optical isolators and the second protrusions used as the insulating barrier blocks on the second substrate, as shown in part D5 of FIG. 6;

Step E: assembling the first substrate with the second substrate having the optical isolators and the insulating barrier blocks, wherein the first substrate includes the upper transparent substrate 200 and the first electrode 210 formed on the inner side of the upper transparent substrate;

Step F: filling liquid crystal material into a space between the first substrate and the second substrate, thus the Fresnel liquid crystal lens panel for a naked eye three-dimensional display according to the first embodiment of the present invention is finally manufactured.

In a second exemplary embodiment of the present invention, there is provided another Fresnel liquid crystal lens panel for a naked eye three-dimensional display. The difference of the Fresnel liquid crystal lens panel according to this embodiment from the first embodiment lies in that the optical isolators are constituted of a first portion and a second portion in height direction (i.e., up and down direction in FIG. 7).

Figure 7:
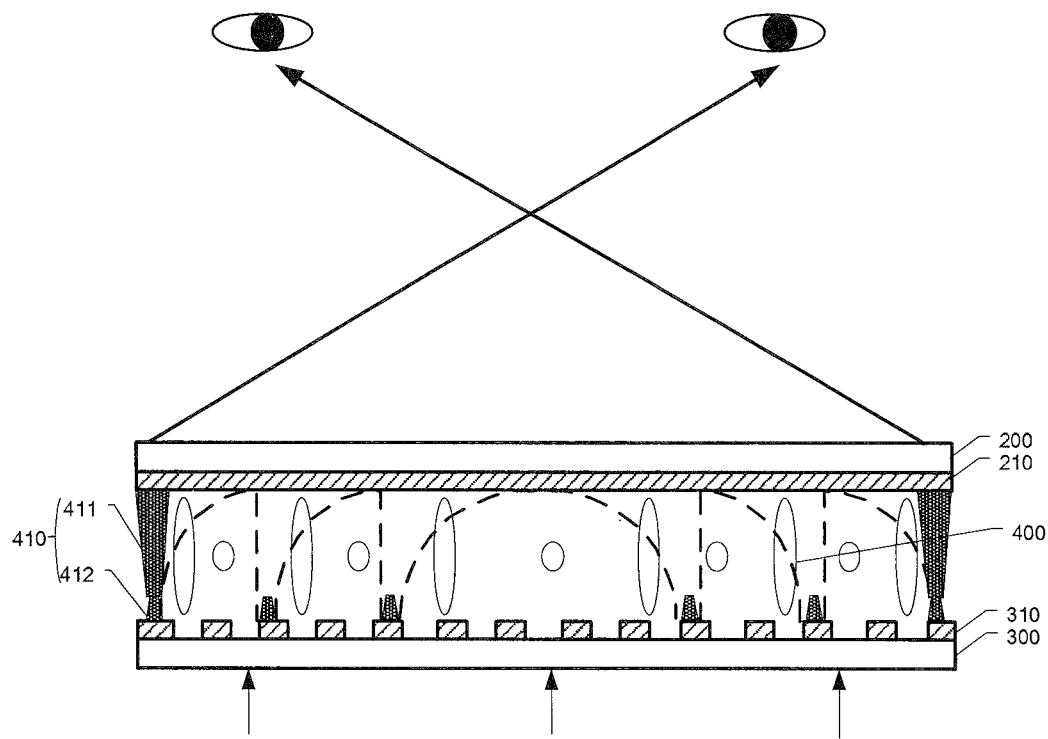
FIG. 7 is a partial cross-sectional view showing schematically a Fresnel liquid crystal lens panel for a naked eye three-dimensional display according to a second embodiment of the present invention.

FIG. 7 is a horizontal cross-sectional view showing schematically a Fresnel liquid crystal lens for a naked eye three-dimensional display according to a second embodiment of the present invention. As shown in FIG. 7, an optical isolator include a first portion 412 and a second portion 411 aligned in height direction, wherein the first portion has a frustoconical shape and is fixed to the inner side of the first substrate, the height of the first portion is identical to that of the insulating barrier blocks; the second portion has a reversed frustoconical shape and is fixed to the inner side of the first substrate, and the second portion is aligned with the first portion in the height direction. Since the position of the optical isolators is fixed, it cannot be moved to liquid crystal sub-pixels, thereby avoiding a crosstalk from occurring.

The first portion of each optical isolator has a height $H_{11}$, and in order to reduce a slight deformation of the first portion and the second portion when they are overlaid, the height $H_{12}$ of the second portion is configured to be slightly greater than a difference between the liquid crystal lens cell thickness H and the height $H_{11}$ of the first portion, a deformation amount is related with selected material, and generally, the deformation amount is, for example, less than 10%, i.e., the following formula is satisfied:

$$H \leq H_{11} + H_{12} \leq 1.1H \quad (2)$$

A manufacturing process of the Fresnel liquid crystal lens for a naked eye three-dimensional display according to the present embodiment will be described below. The masks used during the manufacturing process include a first mask having through-holes corresponding to the shape of the insulating barrier blocks and the optical isolators and a second mask having through-holes corresponding to the shape of the optical isolators.

Figure 8:
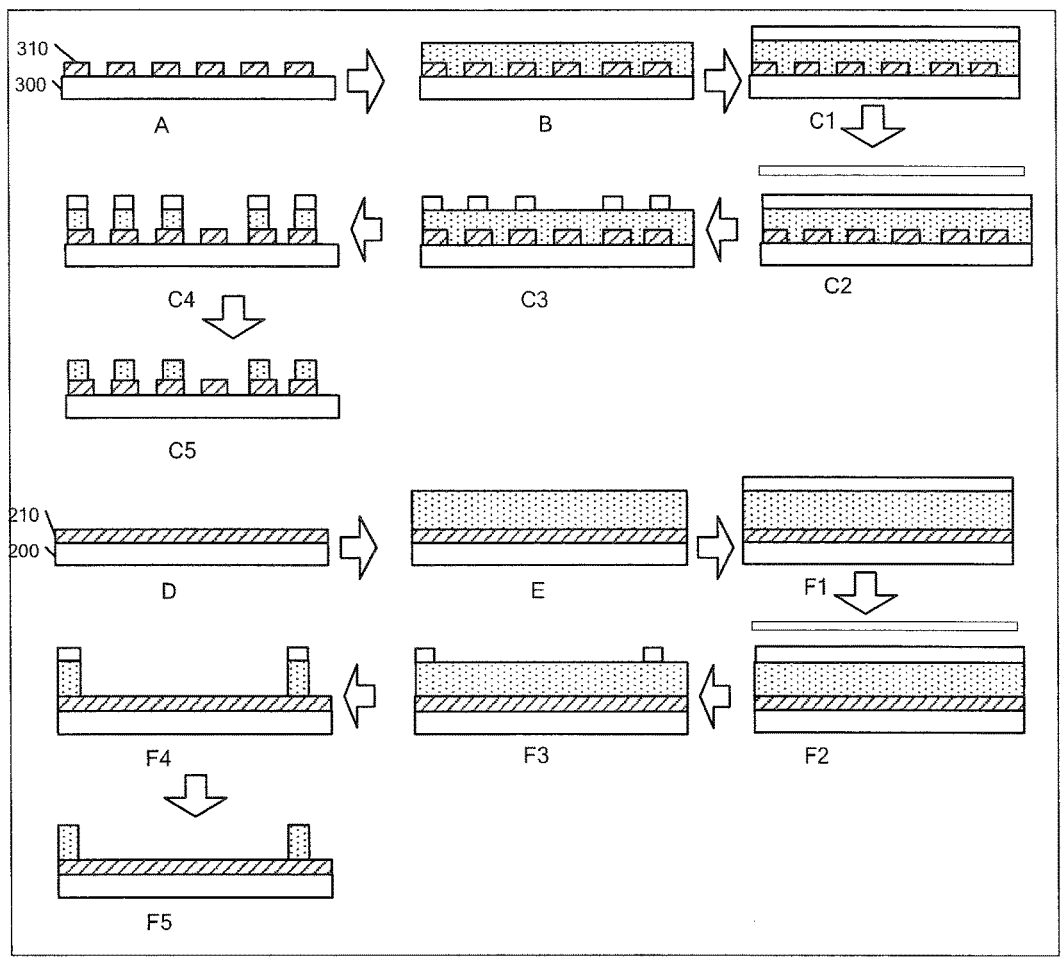
FIG. 8 is a partial cross-sectional view showing schematically the devices obtained after each step during the manufacture of the Fresnel liquid crystal lens panel shown in FIG. 7.

FIG. 8 is a cross-sectional view showing schematically the devices obtained after each step during the manufacture of the Fresnel liquid crystal lens panel shown in FIG. 7. Similarly, for simplification purpose, the frustoconical optical isolators and insulating barrier blocks, which have actually a trapezoidal cross-section in the height direction, are indicated by a cylindrical shape having a rectangular cross-section.

Please refer to FIG. 8, the manufacturing process of the Fresnel liquid crystal lens panel shown in FIG. 7 comprises the following steps:

Step A: manufacturing a plurality of parallel strip-shaped second electrodes 310 on the lower transparent substrate 300 to form the second substrate, as shown in part A of FIG. 8.

Step B: coating a resin material on the second substrate, as shown in part B of FIG. 8.

Step C: etching the coated resin material to form a plurality of first protrusions having height $H_2$ at the locations where the optical isolators and the insulating barrier blocks are to be formed, wherein $H_2$ is a predetermined height of the insulating barrier blocks.

The step C includes specifically the following steps:

Sub-step C1: coating a photoresist material on the resin material, as shown in part C1 of FIG. 8;

Sub-step C2: exposing the photoresist using a first mask, as shown in part C2 of FIG. 8;

Sub-step C3: stripping the exposed photoresist to form a photoresist mask pattern aligned with the first protrusions, as shown in part C3 of FIG. 8;

Sub-step C4: etching the resin material by means of the above photoresist mask pattern, as shown in part C4 of FIG. 8;

Sub-step C5: removing residual photoresist to obtain the second substrate containing a plurality of first protrusions, which are to form the first portions of the optical isolators and the insulating barrier blocks, as shown in part C5 of FIG. 8;

Step D: manufacturing a planar first electrode on the upper transparent substrate 200 to form the first substrate, as shown in part D of FIG. 8;

Step E: coating a resin material on the first substrate, as shown in part E of FIG. 8;

Step F: etching the resin material on the first substrate to form a plurality of second protrusions having height $H_{12}$ at the location where the second portions of the optical isolators are to be formed, wherein $H_2 + H_{12} > H$, and H is a predetermined height of the optical isolators;

The step F includes specifically the following steps:

Sub-step F1: coating a photoresist on the resin material, as shown in part F1 of FIG. 8;

Sub-step F2: exposing the photoresist using a second mask, as shown in part F2 of FIG. 8;

Sub-step F3: removing the exposed photoresist to form a photoresist mask pattern aligned with the second portions, as shown in part F3 of FIG. 8;

Sub-step F4: etching the resin material by means of the photoresist mask pattern, as shown in part F4 of FIG. 8;

Sub-step F5: removing residual photoresist to obtain the first substrate containing the second portions used as the optical isolators, as shown in part F5 of FIG. 8;

Step G: assembling the first substrate with the second substrate, aligning the first portions with the second portions to form the optical isolators, and the first protrusions that are not used as the first portions are used as the insulating barrier blocks;

Step H: filling liquid crystal material into a space between the first substrate and the second substrate, thus, the Fresnel liquid crystal lens panel for a naked eye three-dimensional display according to the second embodiment of the present invention is finally manufactured.

According to a further aspect of an exemplary embodiment of the present invention, there is provided a 3D display. The 3D display comprises: a 2D display device 100; and a Fresnel liquid crystal lens panel. The Fresnel liquid crystal lens panel is a Fresnel liquid crystal lens panel according to anyone of the two above described embodiments, and is disposed in front of the 2D display device in a direction towards a viewer.

As shown in FIG. 4, in this embodiment, the 2D display device 100 is a 2D liquid crystal panel comprising a primary color pattern composed of a plurality of sub-pixel units and black matrixes BM constituted of light-proof regions between sub-pixel units. In the Fresnel liquid crystal lens panel, the projection of the optical isolators located at the boundaries of adjacent Fresnel liquid crystal lens regions on the liquid crystal panel is located within light-proof regions of the black matrixes BM. The optical isolators are aligned with light-proof regions of the black matrixes of the 2D liquid crystal panel, without affecting adversely the display effect.

Wherein the sub-pixel units in the 2D liquid crystal panel may be three-color RGB sub-pixel units, or four-color RGBW sub-pixel units, or four-color RGBY sub-pixel units.

Although the 2D display device in this embodiment is a liquid crystal panel, the present disclosure is not so limited. The 2D display device may also be OLDE display panel or CRT display, etc., in which a 3D effect can be achieved from 2D images by means of the Fresnel liquid crystal lens panel according to the present disclosure.

It should be noted that the 3D display can be used in flat panel televisions, computer displays, mobile phones, tablet PCs and other products.

In addition, the above described definitions for various elements and methods are not only limited to various specific structures, shapes or manners as mentioned in the embodiments, modification or replacement may be easily made to that by those skilled in the art.

In the Fresnel liquid crystal lens panel, the manufacturing method thereof, and the 3D display device according to the embodiments of the present invention, adjacent side lobes of the Fresnel liquid crystal lens are separated by means of the insulating barrier blocks at boundaries therebetween, the crosstalk between the lens regions is reduced; the insulating barrier blocks are made of a resin material, which has a high transmittance higher than 90%, thus it will not affect display brightness, and black stripes in the 2D image are avoided. The optical isolators for supporting the first and the second substrates adopt a cylindrical or frustoconical configuration have relatively fixed positions and will not be moved outside of a predetermined region, thereby avoiding an optical crosstalk of the stereoscopic display caused by the movement of the optical isolators; the optical isolators and the insulating barrier blocks both are made of transparent resin materials, which simplifies manufacturing step and improves production efficiency; the optical isolators are aligned with light-proof regions of the black matrixes of the 2D liquid crystal panel, and will not affect the display effect adversely.

The objective, the technical solutions, and the advantages of the present disclosure have been further described in detail with reference to the above described specific embodiments, it should be understood that the above description is only the specific embodiment of the present invention, but not to limit the present invention, any modifications, equivalents, improvements and the like within the spirit and principle of the present invention are falling into the scope of the present invention.

What is claimed is:

1. A Fresnel liquid crystal lens panel, comprising:
   a first substrate comprising a first transparent substrate and a first electrode formed on an inner side of the first transparent substrate;
   a second substrate comprising a second transparent substrate arranged relative to the first transparent substrate and a plurality of spaced-apart, strip-shaped second electrodes formed on an inner side of the second transparent substrate;
   a liquid crystal layer filled in a space between the first and second substrates, and divided into a plurality of lens regions, liquid crystal molecules within each lens region being deflected at different angles to form a Fresnel liquid crystal lens when different driving voltages are applied to respective second electrodes within the lens region; and
   a plurality of insulating barrier blocks, each of the plurality of insulating barriers being located at an inner side of the second substrate and arranged between two adjacent side lobes of the Fresnel liquid crystal lens,
   wherein a height of the insulating barrier blocks is smaller than a cell thickness of the Fresnel liquid crystal lens panel.

2. The Fresnel liquid crystal lens panel according to claim 1, further comprising an optical isolator arranged at a boundary between two adjacent lens regions for blocking light in one of the two adjacent lens regions from being transmitted into the other one of the two adjacent lens regions.

3. The Fresnel liquid crystal lens panel according to claim 2, wherein the optical isolator and the insulating barrier blocks are made of a resin material.

4. The Fresnel liquid crystal lens panel according to claim 3, wherein transmittance of the resin material is greater than 90%, and viscosity of the resin material is greater than 10 mPa·s.

5. The Fresnel liquid crystal lens panel according to claim 1, wherein insulating barrier blocks are strip-shaped, and wherein a cross-section of each of the insulating barrier blocks is trapezoidal, rectangular or triangular.

6. The Fresnel liquid crystal lens panel according to claim 5, wherein the shape of the cross-section of each of the insulating barrier blocks is an isosceles trapezoid satisfying:
   $H_2 < H$, and
   $L_{22} \leq L_{21} < L$,
   wherein H is cell thickness of the Fresnel liquid crystal lens panel, L is width of the second electrode, $H_2$, $L_{21}$, and $L_{22}$ are height, bottom side length and top side length of the isosceles trapezoid, respectively.

7. The Fresnel liquid crystal lens panel according to claim 1, wherein the insulating barrier blocks located at one side of a central line of the Fresnel liquid crystal lens are symmetrical to the insulating barrier blocks located at the other side of the central line.

8. The Fresnel liquid crystal lens panel according to claim 2, wherein each optical isolator has a frustoconical, cylindrical, prismatic or truncated pyramid shape.

9. The Fresnel liquid crystal lens panel according to claim 8, wherein the optical isolator has a frustoconical or truncated pyramid shape, and a cross-sectional shape of the optical isolator in a height direction is a trapezoid satisfying:
   $H \leq H_1 \leq 1.1H$,
   $L_{11} \leq 5H$,
   $L_{12} \leq 3H$, and
   $L_{12} \leq L_{11}$,
   wherein H is cell thickness of the Fresnel liquid crystal lens panel, $H_1$, $L_{11}$, and $L_{12}$ are height, bottom side length and top side length of the trapezoid, respectively.

10. The Fresnel liquid crystal lens panel according to claim 2, wherein the optical isolator comprises:
    a first portion fixed to the inner side of the second substrate, the height of the first portion being identical to that of the insulating barrier blocks; and
    a second portion fixed between the inner side of the first substrate and the first portion, and aligned with the first portion in a height direction.

11. The Fresnel liquid crystal lens panel according to claim 10, wherein the first portion of the optical isolator has a frustoconical shape, the cross-section of which in the height direction is a trapezoid, and the second portion of the optical isolator has a reverse frustoconical shape, the cross-section of which in the height direction is a reversed trapezoid.

12. The Fresnel liquid crystal lens panel according to claim 10, wherein the first portion and the second portion of the optical isolator satisfy:
    $H \leq H_{11} + H_{12} < 1.1H$,
    wherein, H is cell thickness of the Fresnel liquid crystal lens panel, $H_{11}$ and $H_{12}$ are heights of the first portion and the second portion of the optical isolator, respectively.

13. The Fresnel liquid crystal lens panel according to claim 1, wherein,
    each lens region is provided with at least three second electrodes;
    both the first transparent substrate and the second transparent substrate are glass substrates, and both the first electrode and the second electrodes are made of indium tin oxide.

14. A 3D display, comprising:
    a 2D display device; and
    a Fresnel liquid crystal lens panel according to claim 1 disposed in front of the 2D display device in a direction toward a viewer.

15. The 3D display according to claim 14, wherein the 2D display device is a liquid crystal panel comprising a primary color pattern composed of a plurality of sub-pixel units and black matrixes located between adjacent sub-pixel units; and wherein the projection of an optical isolators of the Fresnel liquid crystal lens panel on the liquid crystal panel is located within the black matrixes.

16. The Fresnel liquid crystal lens panel according to claim 3, wherein the optical isolator comprises:
    a first portion fixed to the inner side of the second substrate, the height of the first portion being identical to that of the insulating barrier blocks; and a second portion fixed between the inner side of the first substrate and the first portion, and aligned with the first portion in a height direction.

17. A method for manufacturing a Fresnel liquid crystal lens panel, comprising the steps of:
providing a plurality of spaced-apart, strip-shaped second electrodes on a second transparent substrate to form a second substrate;
performing a first coating of a resin material on the second substrate;
etching the resin material coated by the first coating to form a plurality of spaced-apart first protrusions having a height $H_1$;
performing a second coating of the resin material, and etching the resin material coated by the second coating again, and maintaining the height of the first protrusions located at an outer region of the second substrate unchanged, while reducing the heights of other first protrusions to a predetermined height $H_2$, thereby forming second protrusions;
assembling the first substrate with the second substrate such that the first protrusions are used as optical isolators and the second protrusions are used as insulating barrier blocks; and
filling liquid crystal material into a space between the first substrate and the second substrate.

18. The method according to claim 17, wherein the resin material coated by the first coating is etched by means of a first mask having through-holes corresponding to the shape of the insulating barrier blocks and the optical isolators, and the resin material coated by the second coating is etched by means of a second mask having through-holes corresponding to the shape of the optical isolators.

* * * * *